(12) United States Patent
Harmon et al.

(10) Patent No.: US 12,319,161 B2
(45) Date of Patent: *Jun. 3, 2025

(54) ADAPTOR PLUG FOR AN ELECTRIC VEHICLE

(71) Applicant: FORD GLOBAL TECHNOLOGIES, LLC, Dearborn, MI (US)

(72) Inventors: Michael John Harmon, Westland, MI (US); Tithal Bhandari, Streamwood, IL (US); Hussain Z Tajmahal, Detroit, MI (US); Yejin Han, Detroit, MI (US); Ryan Warner, Ann Arbor, MI (US); Rachel Williams, Fremont, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 763 days.

This patent is subject to a terminal disclaimer.

(21) Appl. No.: 17/332,224

(22) Filed: May 27, 2021

(65) Prior Publication Data

US 2022/0379750 A1 Dec. 1, 2022

(51) Int. Cl.
*B60L 53/16* (2019.01)
*H01R 13/24* (2006.01)
*H01R 13/422* (2006.01)
*H01R 13/453* (2006.01)

(52) U.S. Cl.
CPC .......... *B60L 53/16* (2019.02); *H01R 13/2492* (2013.01); *H01R 13/4223* (2013.01); *H01R 13/4538* (2013.01)

(58) Field of Classification Search
CPC ....................................................... B60L 53/16
USPC ......................................................... 320/109
See application file for complete search history.

(56) References Cited

U.S. PATENT DOCUMENTS

| | | | |
|---|---|---|---|
| 5,401,174 A | 3/1995 | Hansen | |
| 7,999,506 B1 | 8/2011 | Hollar et al. | |
| 10,286,793 B2 | 5/2019 | Paryani et al. | |
| 2009/0121673 A1 | 5/2009 | Nakayama et al. | |
| 2012/0206100 A1* | 8/2012 | Brown | B60L 53/18 320/109 |
| 2017/0334302 A1 | 11/2017 | Henderson et al. | |
| 2019/0135131 A1* | 5/2019 | Wenz | H01R 4/308 |

(Continued)

FOREIGN PATENT DOCUMENTS

| | | |
|---|---|---|
| CN | 108631090 B | 4/2021 |
| CN | 112959907 B | 3/2022 |

(Continued)

*Primary Examiner* — Yalkew Fantu
(74) *Attorney, Agent, or Firm* — David B Kelley; Brooks Kushman P.C.

(57) ABSTRACT

An adapter plug for a charging port of an electric vehicle includes a housing, a first electrical connector, and a second electrical connector. The housing has circuitry disposed therein. The first electrical connector is integral to the housing, faces a first direction, and has a first profile. The first profile is configured to mate with the charging port and connect the circuitry to the charging port. The second electrical connector is integral to the housing, faces a second direction opposing the first direction, and has a second profile. The second profile matches the charging port. The second profiled is configured to mate with a connector head of a charging station and connect the circuitry to the connector head.

19 Claims, 4 Drawing Sheets

(56) References Cited

U.S. PATENT DOCUMENTS

| | | | |
|---|---|---|---|
| 2019/0217717 A1* | 7/2019 | Erb | B60L 58/13 |
| 2019/0217730 A1* | 7/2019 | Götz | H01R 13/506 |
| 2019/0351783 A1* | 11/2019 | Goei | B60L 53/63 |
| 2021/0086640 A1 | 3/2021 | Cole et al. | |
| 2021/0197684 A1 | 7/2021 | Graham et al. | |
| 2021/0198093 A1 | 7/2021 | Graham et al. | |
| 2021/0347274 A1 | 11/2021 | Kadoko et al. | |
| 2022/0072972 A1 | 3/2022 | Yu et al. | |
| 2022/0153156 A1 | 5/2022 | Goei et al. | |

FOREIGN PATENT DOCUMENTS

| | | |
|---|---|---|
| DE | 102011114321 A1 | 3/2013 |
| DE | 102019100580 A1 | 7/2020 |
| DE | 102019107330 A1 | 9/2020 |
| EP | 2555340 B1 | 9/2015 |
| EP | 3512050 A1 | 7/2019 |
| EP | 3782847 A1 | 2/2021 |
| WO | 2012146766 A1 | 11/2012 |
| WO | 2016077690 A1 | 5/2016 |
| WO | 2020239871 A1 | 12/2020 |

* cited by examiner

ADAPTOR PLUG FOR AN ELECTRIC VEHICLE

TECHNICAL FIELD

The present disclosure relates to hybrid/electric vehicles and charging systems for hybrid/electric vehicles.

BACKGROUND

Hybrid/electric vehicles may be propelled by electric machines that draw power from batteries. In some configurations, the batteries may require charging during non-use.

SUMMARY

An adapter plug for a charging port of an electric vehicle includes a housing, a first electrical connector, and a second electrical connector. The housing has circuitry disposed therein. The first electrical connector is integral to the housing, faces a first direction, and has a first profile. The first profile is configured to mate with the charging port and connect the circuitry to the charging port. The second electrical connector is integral to the housing, faces a second direction opposing the first direction, and has a second profile. The second profile matches the charging port. The second profiled is configured to mate with a connector head of a charging station and connect the circuitry to the connector head.

An adapter system for a charging port of an electric vehicle includes a plug, an actuator, and a controller. The electrical plug includes first and second electrical connectors. The first electrical connector has a first profile connected to the charging port. The second electrical connector has a second profile that is configured to connect to a connector head of a charging station. The actuator is secured to the plug. The actuator is configured to open and close a door that is disposed over the charging port. The controller is programmed to, in response to a command to establish a connection between the second electrical connector and the connector head of the charging station, operate the actuator to open the door.

An adapter plug includes first and second electrical connectors. The first electrical connector has a first profile configured to engage a charging port of an electric vehicle. The second electrical connector has a second profile that is configured to engage an electrical connector of a charging station. The first and second electrical connectors are orientated at an angle relative to each other that is less than 180° and greater than 90°.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
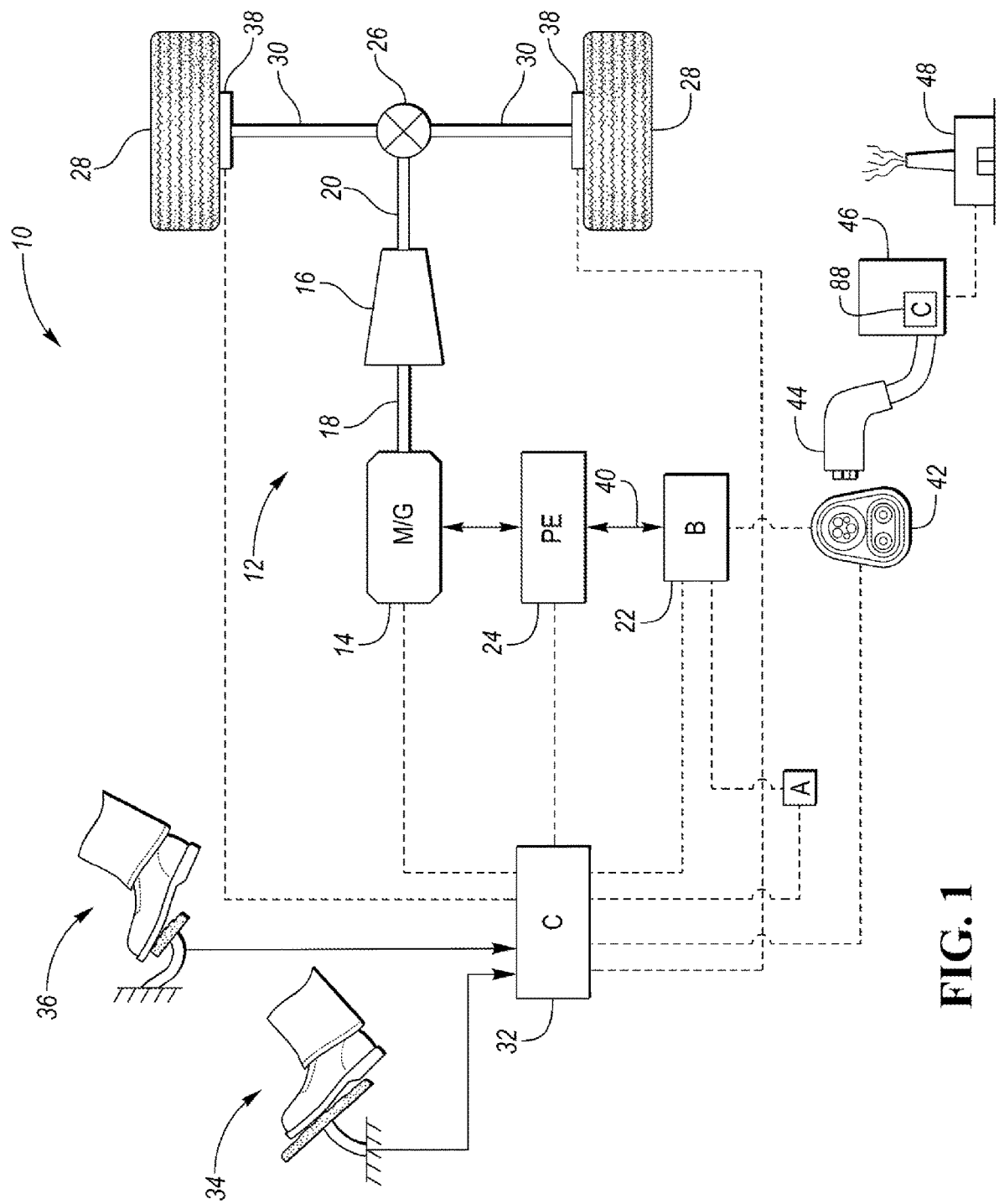
FIG. 1 is a schematic illustration of a representative powertrain of an electric vehicle and a charging station for the electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 that drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (IGN), ambient air temperature (e.g., ambient air temperature sensor 33), transmission gear, ratio, or mode, transmission oil temperature (TOT), transmission input and output speed, deceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving force for the powertrain 12. To drive the vehicle with the M/G 14 the traction battery 22 transmits stored electrical energy through wiring 40 to the power electronics 24 that may include inverter and rectifier circuitry, for example. The inverter circuitry of the power electronics 24 may convert DC voltage from the battery 22 into AC voltage to be used by the M/G 14. The rectifier circuitry of the power electronics 24 may convert AC voltage from the M/G 14 into DC voltage to be stored with the battery 22. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

The vehicle 10 may be configured to receive power from an external power source to charge the battery 22. For example, the vehicle 10 may include an electrical port 42 that is configured to engage a connector head 44 of a charging station 46 to receive power from the charging station 46 to charge the battery 22. The electrical port 42 may also be referred to as a charging port. The charging station 46 may be connected to a power grid that receives electrical power from a power plant 48.

It should be understood that the schematic illustrated in FIG. 1 is merely representative and is not intended to be limiting. Other configurations are contemplated without deviating from the scope of the disclosure. For example, the vehicle powertrain 12 may be configured to deliver power and torque to the one or both of the front wheels as opposed to the illustrated rear wheels 28.

Figure 2:
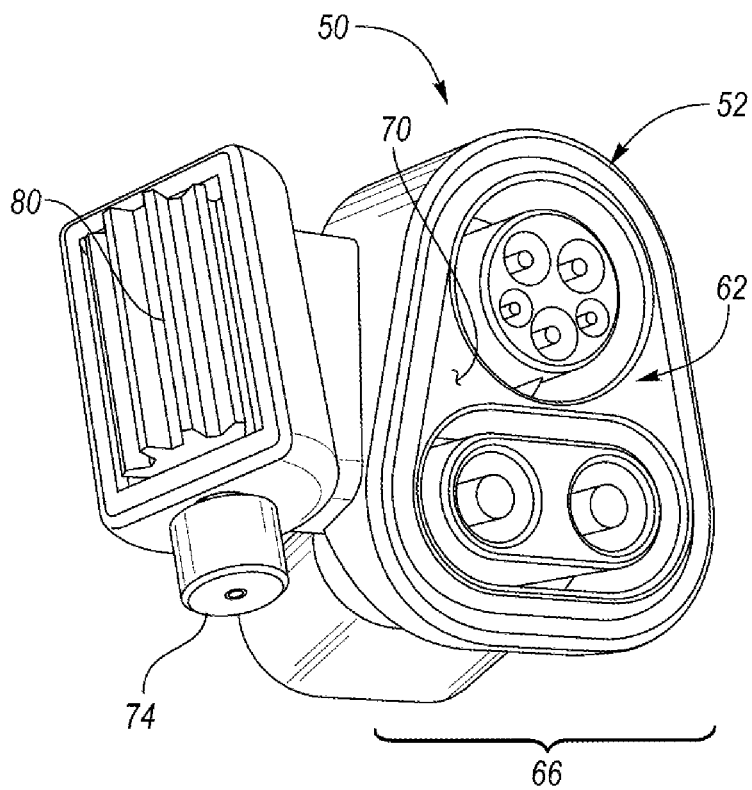
FIG. 2 is a front isometric view of an adapter plug for a charging port of the electric vehicle.
Figure 3:
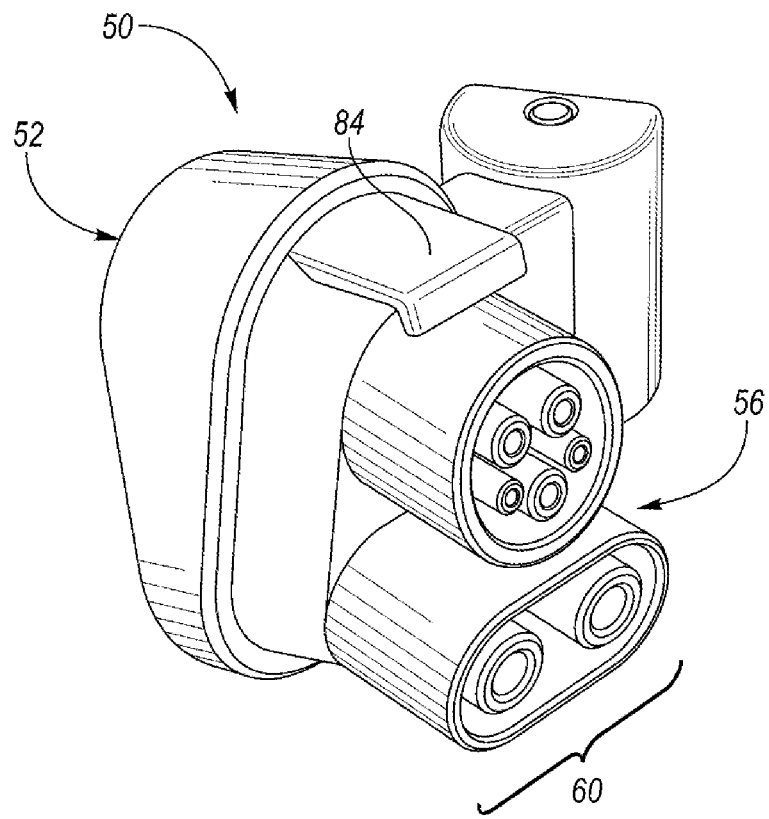
FIG. 3 is a rear isometric view of the adapter plug.
Figure 4:
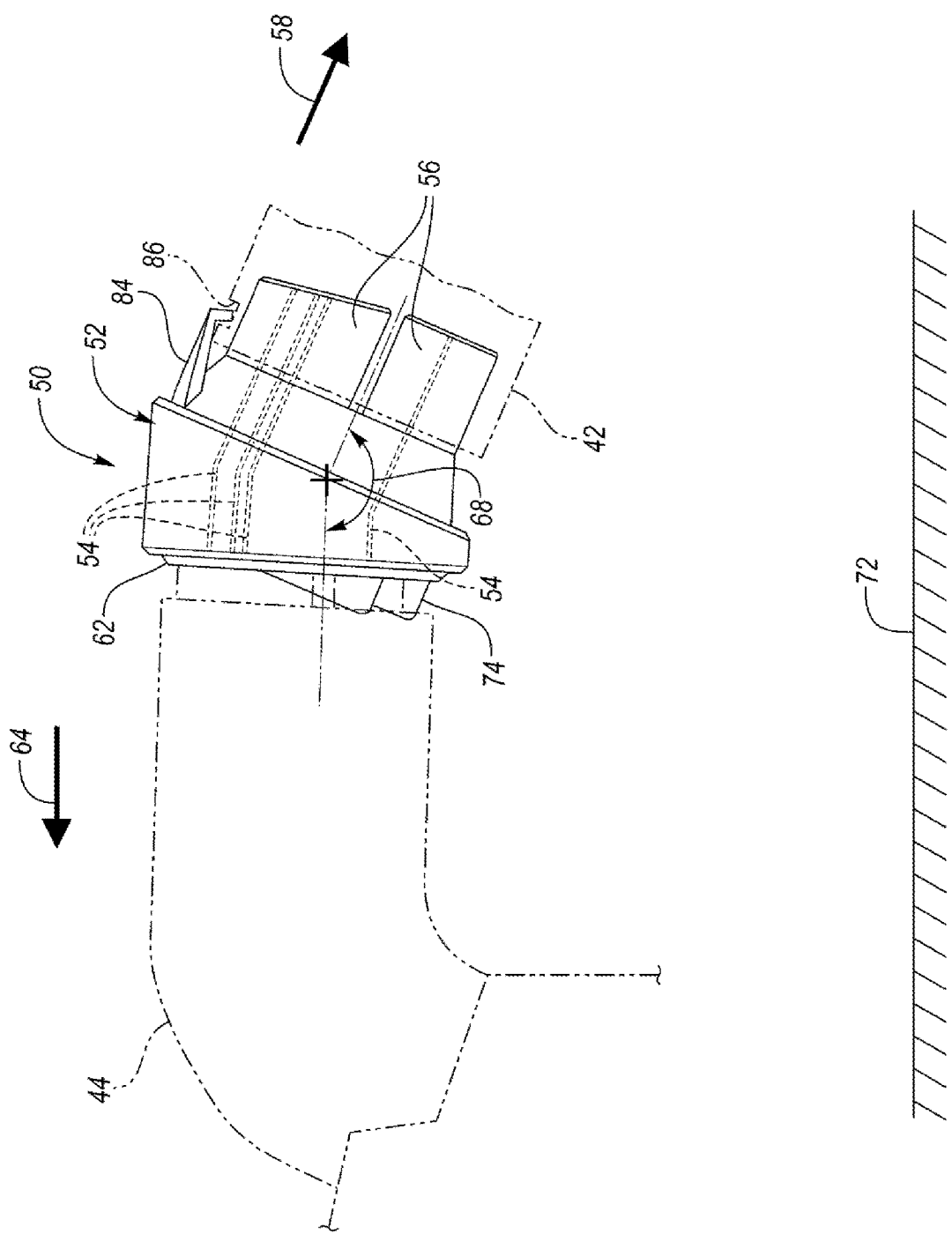
FIG. 4 is a side view of the adapter plug illustrating (i) a connection between the adaptor plug and the charging port of the electric vehicle and (ii) a connection between the adaptor plug and a connector head of the charging station.

Referring to FIGS. 2-4, an adaptor plug 50 for the charging port 42 is illustrated. The adaptor plug 50 has a housing 52. Electrical circuitry 54 is disposed within the housing 52. The adapter plug 50 has a first electrical connector 56 that may be integral to the housing 52. The first electrical connector 56 faces a first direction 58. The first electrical connector 56 has a first profile 60 that is configured to mate with the charging port 42. The first electrical connector 56 is configured connect the circuitry 54 that is disposed within the housing 52 of adaptor plug 50 to the charging port 42. The first profile 60 may that match the profile of the connector head 44 of the charging station 46 (e.g., the first electrical connector 56 and the connector head 44 may be configured to connect with the same or same type of electrical device, such as the charging port 42).

The adapter plug 50 has a second electrical connector 62 that may be integral to the housing 52. The second electrical connector 62 faces a second direction 64. The second electrical connector 62 has a second profile 66 that is configured to mate with the connector head 44 of the charging station 46. The second electrical connector 62 is configured connect the circuitry 54 that is disposed within the housing 52 of adaptor plug 50 to the connector head 44 of the charging station 46. The second profile 66 may that match the profile of the charging port 42 (e.g., the second electrical connector 62 and the charging port 42 may be configured to receive the same or same type of electrical device, such as the connector head 44). The electrical connections illustrated herein are SAE J1772 type electrical connections. However, it should be understood that the electrical connections may be any type of electrical connection utilized to connect an electric vehicle to a charging station. For example, the electrical connections could be SAE J1772 type electrical connections, CCS1 type electrical connections, etc.

The second direction 64 may be an opposite or opposing direction relative to the first direction 58. However, as opposed to being completely opposite directions (i.e., directions that are oriented at 180° relative to each other), the first direction 58 and the second direction 64 may be oriented at an at an angle 68 relative to each other that is less than 180° and greater than 90°. Stated in other terms, the first electrical connector 56 and the second electrical connector 62 may be oriented at an angle 68 relative to each other that is less than 180° and greater than 90°. The value of angle 68 may be selected to orient a front face 70 of the second electrical connector 62 at any desirable angle. However, the value of angle 68 may more specifically be selected to orient the front face 70 of the second electrical connector 62 such that the front face 70 of the second electrical connector 62 is substantially perpendicular to a ground surface 72 when the first electrical connector 56 is mated to the charging port 42. Substantially perpendicular may refer to any incremental value between exactly perpendicular and 15° from exactly perpendicular.

The adaptor plug 50 functions to reorient the connection between charging port 42 of the vehicle 10 and the connector head 44 of the charging station 46. It may be desirable to reorient the connection between the charging port 42 and the connector head 44 when the connector head 44 is being connected to the vehicle 10 through an automated process and the tooling of the automated process requires a specific orientation. An electrical connection between the connector head 44 and the charging port 42 may be established via the circuitry 54 that is disposed within the housing 52 of the adaptor plug 50 to charge the battery 22.

Figure 5:
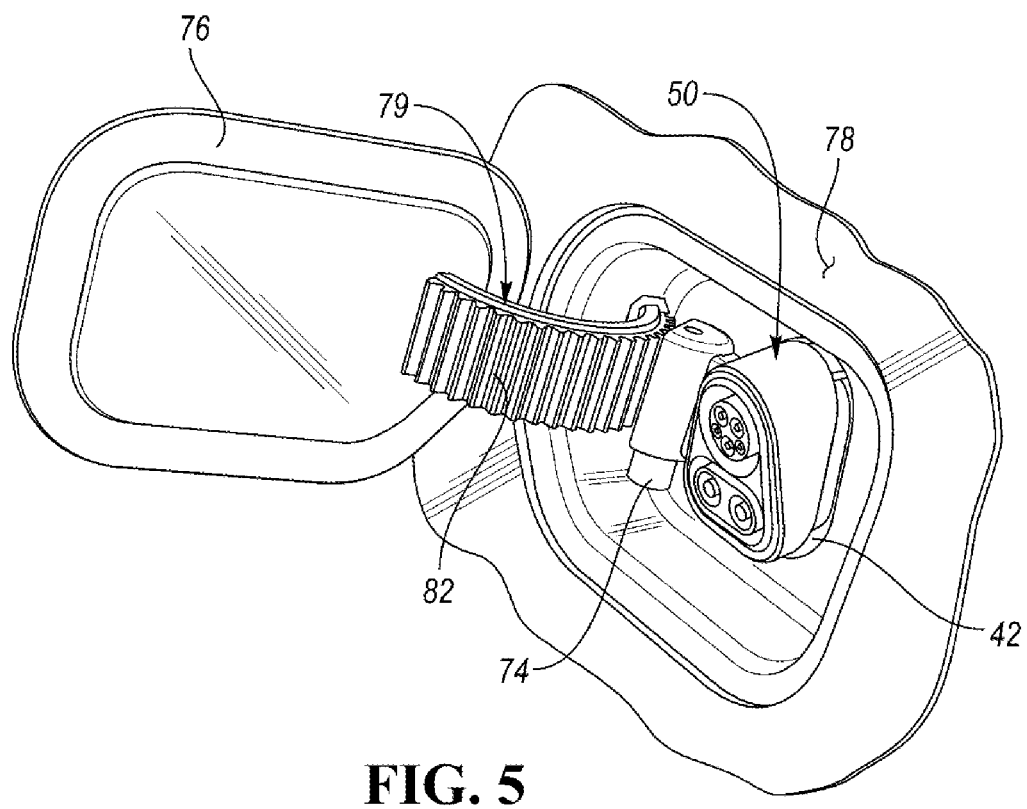
FIG. 5 is a front isometric view of the adapter plug disposed within the charging port of the electric vehicle with a charging port door in an open position.
Figure 6:
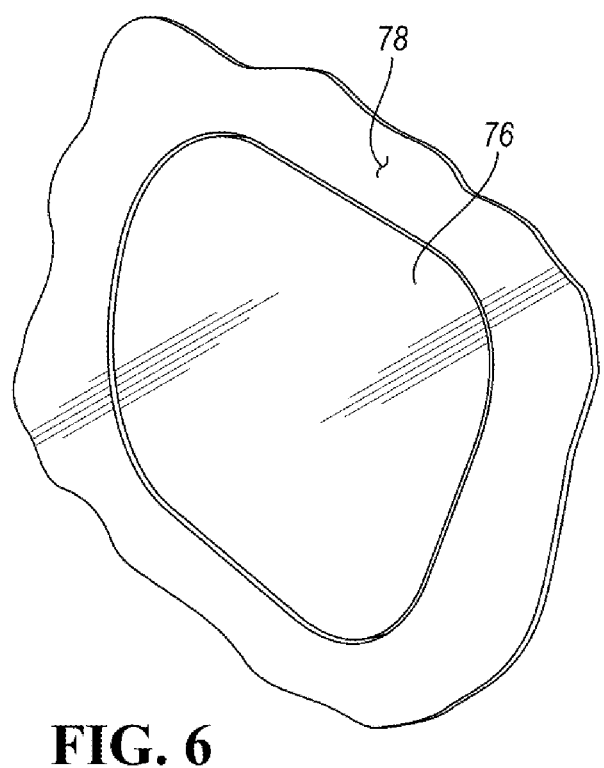
FIG. 6 is a front isometric view of the charging port door in a closed position.

Referring now to FIGS. 5-6, the adaptor plug 50 is shown as being disposed within the charging port 42 (i.e., the first electrical connector 56 is connected to the charging port 42). The adaptor plug may include an actuator 74 that is secured to the housing 52. The actuator 74 may be configured to open (e.g., FIG. 5) and close (e.g., FIG. 6) a door 76 that is disposed over the charging port 42 on an exterior 78 of the vehicle 10. The door 76 may be configured to shelter the charging port 42 (and adaptor plug 50 when disposed in the charging port 42) from the external elements (e.g., snow or rain) when the charging port 42 is not in use. The door 76 may be connected to the vehicle 10 via an arm 79 that rotates in and out of a slot. More specifically, the actuator 74 may be configured to rotate a first gear 80 that is disposed on the adaptor plug 50. The first gear 80 then engages a second gear 82 that is disposed on the arm 79 to open and close the door 76. The second gear 82 may be a partial gear. The actuator 74 may be any type of actuator, such and an electric motor or servo motor.

The circuitry 54 that is disposed within the housing 52 may be configured to establish an electrical connection between the actuator 74 and battery 22 when the first electrical connector 56 is mated with and connected to the charging port 42. The battery 22 may provide electrical power to the actuator 74. The circuitry 54 that is disposed within the housing 52 may also be configured to establish an electrical connection between the actuator 74 and controller 32 when the first electrical connector 56 is mated with and connected to the charging port 42.

A clip 84 may be disposed on the adaptor plug 50. The clip 84 may be configured to lock the adapter plug 50 to the charging port 42 in response to the first electrical connector mating with and connecting to the charging port 42. The clip 84 may be rotatably secured to the adapter plug 50 and may include a biasing element, such as a spring, that biases the clip 84 into engagement with the charging port 42. The charging port 42 may define notch 86 and the clip 84 may, more specifically, engage the notch 86 to lock the adapter plug 50 to the charging port 42.

The charging station 46 may also include a controller 88 that has the same or similar characteristics as described above with respect to controller 32. Controllers 32 and 88 may communicate with each other during charging, while the vehicle 10 is performing a parking maneuver (which may be automated) to align and connect the charging port 42 with the connector head 44, during an automated process where the charging station 46 maneuvers the connector head 44 to align and connect the connector head 44 with the charging port 42, or any combination of such actions. Such communication may be any form of wireless communication including, but not limited to, radio, Bluetooth, Wi-Fi, etc. Such communication may be directly between the controllers or over a wireless network.

The vehicle controller 32 may be programmed to, in response to a command to establish a connection between the second electrical connector 62 and the connector head 44 of the charging station 46, operate the actuator 74 to open the door 76. Such a command may be generated during an automated parking maneuver, may be selected manually by an operator (e.g., via the operator pushing a button on a control panel to open the door 76), may be generated by an automated process where the charging station 46 maneuvers the connector head 44 to align and connect the connector head 44 with the charging port 42, may occur in response to a manual parking maneuver that includes the vehicle 10 approaching the charging station 46, or may occur in response to any other action that may be indicative that a connection between the charging port 42 and the connector head 44 via the adaptor plug 50 is desired.

The vehicle controller 32 may also be programmed to in response to disconnecting the connector head 44 of the charging station 46 from the second electrical connector 62, operate the actuator 74 to close the door 76. Such a disconnection may occur automatically, may occur in response to a full charge of the battery 22, may occur in response to the operator starting the vehicle 10, may occur manually, or may occur in response to any other action that may be indicative that a connection between the charging port 42 and the connector head 44 via the adaptor plug 50 is not desired.

The adaptor plug 50 and the second gear 82 may be part of a retrofit kit that are purchased aftermarket and secured to the vehicle 10 to adapt the vehicle 10 to the functionality of the charging station 46. Such a retrofit kit may include reorienting the charging port 42, adapting the charging port 42 to new types of electrical connections, etc.

It should be understood that the designations of first, second, third, fourth, etc. for any component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An adapter plug for a charging port of an electric vehicle comprising:
   a housing having circuitry disposed therein:
   a first electrical connector integral to the housing, facing a first direction, and having a first profile configured to mate with the charging port and connect the circuitry to the charging port, wherein the first profile matches a connecter head of a charging station such that the first electrical connector and the connector head of the charging station are each configured to mate with the charging port;
   a second electrical connector integral to the housing, facing a second direction opposing the first direction, configured to mate with the connector head of the charging station and connect the circuitry to the connector head, and having a second profile that matches the charging port such that the second electrical connector and the charging port are each configured to mate with the connector head of the charging station; and an actuator that is secured to the housing and is configured to open and close a door that is connected to the vehicle and disposed over the charging port on the vehicle.

2. The adapter plug of claim 1, wherein the first and second directions are orientated at an angle relative to each other that is less than 180° and greater than 90°.

3. The adapter plug of claim 2, wherein a front face of the second electrical connector is substantially perpendicular to a ground surface when first electrical connector is mated to the charging port.

4. The adapter plug of claim 1, wherein the actuator is configured to rotate a first gear that engages a second gear disposed on the door to open and close the door.

5. The vehicle of claim 4, wherein the circuitry is configured to establish an electrical connection between the actuator and a vehicle battery when the first electrical connector is mated with the charging port.

6. The adapter plug of claim 1 further comprising a clip that is configured to lock the adapter plug to the charging port in response to the first electrical connector mating with the charging port.

7. An adapter system for a charging port of an electric vehicle comprising:
a plug having,
a first electrical connector having a first profile connected to the charging port, wherein the first profile matches a connecter head of a charging station such that the first electrical connector and the connector head of the charging station are each configured to mate with the charging port, and
a second electrical connector having a second profile that is configured to connect to the connector head of the charging station, wherein the second profile matches the charging port such that the second electrical connector and the charging port are each configured to mate with the connector head of the charging station;
an actuator secured to the plug, wherein the actuator is configured to open and close a door that is connected to the vehicle and disposed over the charging port; and
a controller programmed to, in response to a command to establish a connection between the second electrical connector and the connector head of the charging station, operate the actuator to open the door.

8. The adapter system of claim 7, wherein the controller is further programmed to, in response to disconnecting the connector head of the charging station from the second electrical connector, operate the actuator to close the door.

9. The adapter system of claim 7, wherein the second profile matches a profile of the charging port.

10. The adapter system of claim 7, wherein the first and second electrical connectors are orientated at an angle relative to each other that is less than 180° and greater than 90°.

11. The adapter system of claim 10, wherein a front face of the second electrical connector is substantially perpendicular to a ground surface.

12. The adapter system of claim 7, wherein the actuator is configured to rotate a first gear that engages a second gear connected to the door to open and close the door.

13. The adapter system of claim 12, wherein the second gear disposed on an arm extending from the door.

14. The adapter system of claim 7 further comprising a clip that is configured to lock the plug to the charging port.

15. An adapter plug comprising:
a first electrical connector having a first profile configured to engage a charging port of an electric vehicle; and
a second electrical connector having a second profile that is configured to engage an electrical connector of a charging station, wherein the first and second electrical connectors are orientated at an angle relative to each other that is less than 180° and greater than 90°.

16. The adapter plug of claim 15, wherein a front face of the second electrical connector is substantially perpendicular to a ground surface when the first electrical connector is connected to the charging port.

17. The adapter plug of claim 15 further comprising an actuator configured to open and close a door that is connected to the vehicle and disposed over the charging port.

18. The adapter plug of claim 17, wherein the actuator is configured to rotate a first gear that engages a second gear disposed on the door to open and close the door.

19. The adapter plug of claim 15 further comprising a clip that is configured to lock the adapter plug to the charging port.

* * * * *